United States Patent [19]
Belke

[11] 3,904,224
[45] Sept. 9, 1975

[54] LANDING GEAR HOUSING FOR TRAILERS
[75] Inventor: Jack T. Belke, Grand Rapids, Mich.
[73] Assignee: Westran Corporation, Muskegon, Mich.
[22] Filed: Oct. 15, 1974
[21] Appl. No.: 514,543

[52] U.S. Cl. ............... 280/150.5; 29/428; 280/475
[51] Int. Cl.² .......................................... B60S 9/02
[58] Field of Search ........ 280/150.5, 475; 254/86 R, 254/86 H

[56] References Cited
UNITED STATES PATENTS
2,815,962  12/1957  McKay ........................... 280/150.5
3,236,501  2/1966  McKay ............................... 254/86

Primary Examiner—Leo Friaglia
Attorney, Agent, or Firm—Gifford, Chandler & Sheridan

[57] ABSTRACT

A landing gear housing for a trailer comprising an upper cylindrical portion having means for attaching said cylindrical portion to said trailer and a lower square tubular portion coaxial with said cylindrical portion, wherein said cylindrical portion and said square tubular portion are of integral construction.

4 Claims, 2 Drawing Figures

LANDING GEAR HOUSING FOR TRAILERS

BACKGROUND OF THE INVENTION

I. Field of the Invention

The present invention relates generally to landing gears for trailers and more particularly to an improved landing gear housing.

II. Prior Art

Previously known landing gear housings may be generally categorized into two groups, namely housings constructed of square tubing and housings constructed of cylindrical tubing. Landing gear housings constructed of square metal tubing are more desirable than cylindrical housings since the square housings resist turning more effectively than cylindrical housings. Square tubular housings, however, suffer the major disadvantage that such housings are considerably more expensive than cylindrical housings. Further such housings tend to be weaker in bending moments in the fore and aft direction.

SUMMARY OF THE INVENTION

In the present invention, the lower end of relatively inexpensive cylindrical tubing is squared-off to form a square tubular lower portion of the landing gear housing. By this method of construction, the landing gear housing of the present invention is less expensive to manufacture than square tubing housings but nevertheless achieves the superior anti-turning characteristics of square tubular landing gear housings.

In the preferred form of the invention, the corners of the squared-off tubular portion are in alignment with the inside radius of the cylindrical portion of housing for increased stability of the landing gear. In addition, a square retainer ring is provided around the square tubular portion of the housing for increased strength of the housing.

DESCRIPTION OF THE DRAWING

The present invention will be more clearly understood by reference to the following detailed description when read in conjunction with the accompanying drawing, wherein like reference characters refer to like parts throughout the several views, and in which.

DETAILED DESCRIPTION

Figures 1, 2:
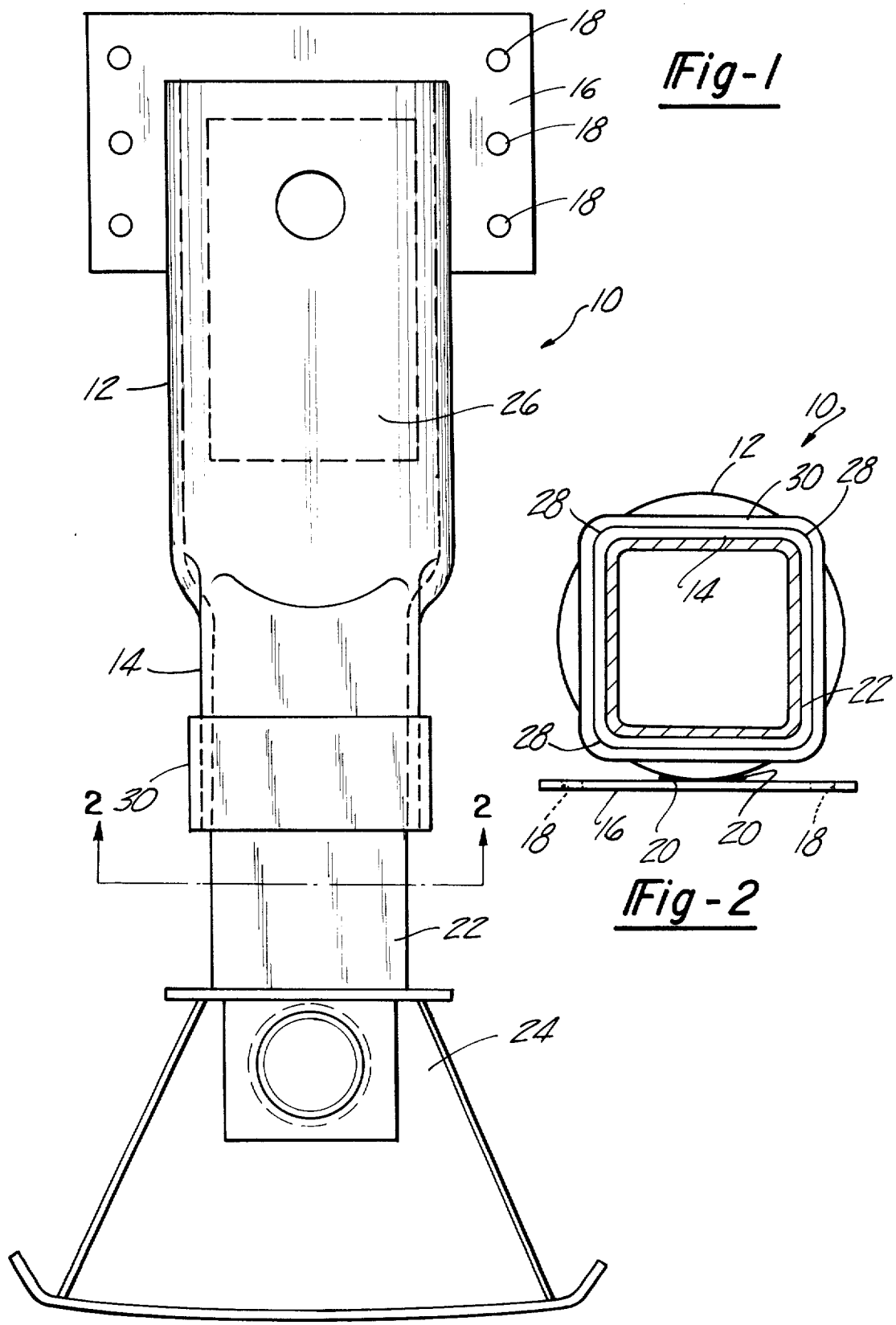
FIG. 1 is a side plan view of the present invention.
FIG. 2 is a partial cross-sectional view taken along line 2—2 in FIG. 1.

The landing gear housing 10 of the present invention generally comprises an upper cylindrical portion 12 and a lower square tubular portion 14 which is coaxial with the cylindrical portion 12. It is to be understood, however, that the portions 12 and 14 are of integral construction.

A plate 16 having apertures 18 therethrough is secured to the upper cylindrical portion 12 of the landing gear housing 10 in any conventional manner, such as by welding as shown at 20. The plate 16 is utilized to attach the landing gear housing 10 to a frame member of a trailer (not shown) such as by inserting bolts through apertures 18 into registering apertures on the frame member.

A cylinder 22 constructed of square tubular metal is typically slidably received within the landing gear housing 10. The cylinder 22 carries a conventional foot 24 at its lower end for engaging the ground or other supporting surface. Although forming no part of the present invention, means 26 are included within the upper cylindrical portion 12 of the housing for axially extending or retracting the cylinder 22 with its attached foot 24 relative to the landing gear housing.

Referring now particularly to FIG. 2, each corner 28 of the square tubular portion 14 is preferably rounded. In addition, the inner diagonal of the square tubular portion 14 is substantially the same as the inside diameter of the cylindrical portion 12 so that the corners 28 are in alignment with the cylindrical portion 12 of the housing 10. It has been found that by so aligning the corners 28 with the cylindrical portion 12, greater stability of the landing gear housing 10 is achieved than when the corners 28 are not so aligned.

A square retaining ring 30 is preferably secured around the square tubular portion 14 by spot welding or the like. By effectively increasing the wall thickness of the square tubular portion 14 (FIG. 2), the retaining ring 30 adds strength to the housing 10 and helps prevent undesirable lateral expansion and bending of the square tubular portion 14.

It can thus be seen that the landing gear housing of the present invention provides the aforementioned advantages of landing gear housings constructed of square tubular metal while maintaining the economies afforded by landing gear housings constructed of cylindrical metal tubing.

Having thus described my invention, many modifications thereto will become apparent to those skilled in the art to which it pertains without deviating from the spirit of the invention as defined by the scope of the appended claims.

What is claimed is:

1. A landing gear housing for a trailer comprising an upper cylindrical portion having means for attaching said cylindrical portion to said trailer and a lower square tubular portion coaxial with said cylindrical portion, wherein said cylindrical portion and said square tubular portion are of integral construction.

2. The invention as defined in claim 1 in which said square tubular portion has rounded corners.

3. The invention as defined in claim 2 wherein said corners of said square tubular portion are in alignment with said cylindrical portion.

4. The invention as defined in claim 1 and including a retaining ring secured around said square tubular portion.

* * * * *